United States Patent
Muijs et al.

(10) Patent No.: US 10,595,014 B2
(45) Date of Patent: Mar. 17, 2020

(54) OBJECT DISTANCE DETERMINATION FROM IMAGE

(71) Applicant: KONINKLIJKE PHILIPS N.V., Eindhoven (NL)

(72) Inventors: Remco Theodorus Johannes Muijs, Eindhoven (NL); Frederik Jan De Bruijn, Eindhoven (NL); Tommaso Gritti, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 283 days.

(21) Appl. No.: 14/342,899

(22) PCT Filed: Sep. 21, 2012

(86) PCT No.: PCT/IB2012/055010
§ 371 (c)(1),
(2) Date: Mar. 5, 2014

(87) PCT Pub. No.: WO2013/046100
PCT Pub. Date: Apr. 4, 2013

(65) Prior Publication Data
US 2014/0210964 A1 Jul. 31, 2014

Related U.S. Application Data

(60) Provisional application No. 61/540,045, filed on Sep. 28, 2011.

(51) Int. Cl.
*H04N 5/225* (2006.01)
*G02B 27/00* (2006.01)
(Continued)

(52) U.S. Cl.
CPC ............ *H04N 13/373* (2018.05); *G06T 7/571* (2017.01); *G06T 7/70* (2017.01); *G06T 2200/21* (2013.01);
(Continued)

(58) Field of Classification Search
CPC ............ H04N 5/2254; H04N 5/23212; H04N 5/23229; H04N 13/0271; G01J 3/0208; G01J 3/0229; G06T 7/004
See application file for complete search history.

(56) References Cited

U.S. PATENT DOCUMENTS

| 8,577,539 B1 * | 11/2013 | Morrison | G01C 21/165 701/28 |
| 2004/0005083 A1 * | 1/2004 | Fujimura | A61B 3/113 382/103 |

(Continued)

FOREIGN PATENT DOCUMENTS

| CN | 101512599 A | 8/2009 |
| CN | 101662694 A | 3/2010 |

(Continued)

OTHER PUBLICATIONS

Levin et al. "Image and depth from a conventional camera with a coded aperture", ACM Transactions on Graphics (TOG), ACM, US, vol. 26, No. 3, Jul. 1, 2007, pp. 70-1-70-9, XP002622004, cited in the application.*

(Continued)

*Primary Examiner* — Jamie J Atala
*Assistant Examiner* — Patrick E Demosky

(57) ABSTRACT

A system for determining a distance to an object comprises an image capture device (101) which has a coded aperture and an image sensor which is positioned out of a focus plane of the coded aperture. A receiver (103) receives an image of a scene from the image sensor and a detector (105) detects (Continued)

at least two image objects of the image corresponding to ghost images of the object resulting from different openings of the coded aperture in response to an optical characteristic of the object. A distance estimator (107) then determines a distance to the object in response to a displacement in the image of the at least two image objects. The distance may be to a person and the image may be a bright pupil image wherein pupils are enhanced by reflection of light by the retina. The image may be compensated by a dark pupil image of the scene.

22 Claims, 10 Drawing Sheets

(51) Int. Cl.
*H04N 13/373* (2018.01)
*G06T 7/70* (2017.01)
*G06T 7/571* (2017.01)

(52) U.S. Cl.
CPC ............... *G06T 2207/10141* (2013.01); *G06T 2207/30041* (2013.01); *G06T 2207/30196* (2013.01)

(56) References Cited

U.S. PATENT DOCUMENTS

| | | | |
|---|---|---|---|
| 2006/0165312 A1* | 7/2006 | Odell | G01B 11/26 382/291 |
| 2007/0296965 A1* | 12/2007 | Brady | G01J 3/02 356/310 |
| 2008/0170479 A1* | 7/2008 | Shimano | G11B 7/128 369/44.11 |
| 2008/0285034 A1* | 11/2008 | Gharib | G01B 11/2509 356/364 |
| 2009/0279737 A1* | 11/2009 | Strens | G01T 1/295 382/103 |
| 2009/0322745 A1 | 12/2009 | Zhang et al. | |
| 2010/0202667 A1* | 8/2010 | Ren | G06K 9/00604 382/117 |
| 2011/0058740 A1* | 3/2011 | Gharib | G01B 11/24 382/173 |
| 2011/0079725 A1* | 4/2011 | Tobin, Jr. | G01T 1/295 250/363.06 |
| 2011/0129054 A1* | 6/2011 | De Villiers | G06T 3/4053 378/2 |
| 2011/0267477 A1* | 11/2011 | Kane | G02B 7/36 348/207.1 |
| 2011/0267485 A1* | 11/2011 | Kane | G01S 11/12 348/222.1 |
| 2011/0316982 A1* | 12/2011 | Steurer | G03B 11/04 348/49 |
| 2012/0025989 A1* | 2/2012 | Cuddihy | G06K 9/00369 340/573.1 |
| 2012/0076362 A1* | 3/2012 | Kane | G06T 5/003 382/106 |
| 2012/0148109 A1* | 6/2012 | Kawamura | G01C 3/06 382/106 |
| 2012/0162375 A1* | 6/2012 | Vlutters | H04N 13/10 348/46 |
| 2012/0250159 A1* | 10/2012 | Abramovich | G02B 27/0075 359/618 |
| 2013/0002794 A1* | 1/2013 | Hines | H04L 65/4076 348/14.01 |
| 2013/0033579 A1* | 2/2013 | Wajs | G02B 7/365 348/46 |
| 2013/0038766 A1* | 2/2013 | Perlman | H04N 5/3572 348/294 |
| 2013/0086674 A1* | 4/2013 | Horvitz | G06F 21/32 726/19 |

FOREIGN PATENT DOCUMENTS

| | | | |
|---|---|---|---|
| WO | WO 2010150177 A1 * | 12/2010 | ......... H04N 13/0003 |
| WO | 2010150177 A1 | 12/2012 | |

OTHER PUBLICATIONS

Zhou et al. "What are Good Apertures for Defocus Deblurring", Computational Photography (ICCP), 2009 IEEE International Conference on, Apr. 16-17, 2009, pp. 1-8. (incorporated as evidence).*
Levin et al. ("Image and depth from a conventional camera with a coded aperture", ACM Transactions on Graphics (TOG), ACM, US, vol. 26, No. 3, Jul. 1, 2007, pp. 70-1-70-9, XP002622004.*
Dodgson et al: "Variation and Extrema of Human Interpupillary Distance"; Proc. SPIE, vol. 5291, Stereoscopic Displays and Virtual Reality Systems Systems XI, A.J. Woods, J.O. Merritt, S.A. Benton, M. T. Bolas (Eds), Jan. 2004, pp. 36-46.
Levin et al: "Image and Depth From a Conventional Camera With a Coded Aperture"; ACM Transactions on Graphics, vol. 26, No. 3, Article 7-, Jul. 2007, pp. 70-1-70-9.

* cited by examiner

OBJECT DISTANCE DETERMINATION FROM IMAGE

CROSS-REFERENCE TO PRIOR APPLICATIONS

This application is the U.S. National Phase application under 35 U.S.C. § 371 of International Application No. PCT/IB2012/055010, filed on Sep. 21, 21012, which claims the benefit of U.S. Provisional Patent Application No. 61/540,045, filed on Sep. 28, 2011. These applications are hereby incorporated by reference herein.

FIELD OF THE INVENTION

The invention relates to determination of a distance to an object based on a single image, and in particular, but not exclusively to determination of a distance to a person based on a bright pupil image.

BACKGROUND OF THE INVENTION

Determination of distance to objects based on images captured by an image capture device such as a still or moving image camera has become of increasing importance.

For example, with the advent of autonomous systems capable of adapting functionality and characteristics to their environment, information about the presence of humans and their precise location is often highly desirable. Examples include monitoring systems for elderly or hospital wards, adaptive lighting systems capable of dimming locally to save energy or change beam shapes and spectral signatures to increase comfort. The precise position of human eyes, in particular, can be of interest for display purposes where the view provided is adapted to the detected eye position, for example to provide optimal views to both eyes for 3D imaging or to create a private view in the direction of the nearest pair of eyes while shielding the view in other directions.

It has been proposed to determine scene depth information by locally analyzing the defocus blur since this is dependent on the distance from the lens to the object. However, conventional lens apertures introduce defocus blur which is mathematically irreversible and not very discriminative to depth. Accordingly such approaches tend to be complex and result in relatively unreliable depth data.

In the article "Image and Depth from a Conventional Camera with a Coded Aperture", by A. Levin, R. Fergus, F. Durand, W. T. Freeman; SIGGRAPH, ACM Transactions on Graphics, August 2007 it has been proposed to alleviate this shortcoming by introducing a coded aperture in the lens of an image sensor thereby shaping the spectral properties of the resulting defocus blur. This system is based on a coded aperture having a broadband pattern and a statistical model of images to recover depth and reconstruct an all-focus image of the scene. However, the approach results in a system with high complexity requiring a high computational resource. Furthermore, the approach may result in depth measurements that are less reliable and accurate than desired. Indeed, the method is particularly difficult in the presence of depth contrasts for objects with similar intensities. In this case, the resulting images represent a superposition of two differently blurred planes.

Hence, an improved system for determining distances to objects based on an image from an image capturing device would be advantageous and in particular a system allowing for increased flexibility, reduced complexity, reduced resource usage (in particular reduced computational resource usage), improved distance determination and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for determining a distance to a scene object, the apparatus comprising: a receiver for receiving a first image of a scene from an image sensor of an image capture device having a coded aperture, the image sensor being positioned out of a focus plane for the scene object; a detector for detecting at least two image objects in the image corresponding to ghost images of the scene object resulting from different openings of the coded aperture in response to an optical characteristic of the scene object, the optical characteristic being a radiation characteristic of the object towards the image capture device; and a distance estimator for determining a distance to the scene object in response to a displacement in the image of the at least two image objects.

The invention may provide improved and/or facilitated distance determination to an object based on an image from an image capture device. The distance to the object can be determined from a single image.

The computational resource may be particularly low as a low complexity detection of image objects correspond to ghost images of the object can be achieved based on the optical characteristic. In particular, the detection does not require complex modeling or assumptions about the scene, and furthermore does not necessitate complex image processing to separate contributions from overlapping defocus blurring kernels. The system may be aimed at using sparse data images wherein specific image objects corresponding to the ghost images are identifiable. In particular, rather than performing a complex image analysis considering the interference/detailed blurring effect caused by an out of focus image sensor, a substantial data processing reduction can be achieved by detecting only specific image objects corresponding to ghost images of the same easily identifiable object. In particular, rather than evaluating the whole image and scene only a very low number of identifiable image objects need to be processed. The system may be particularly suitable to scenarios wherein sparse data images can be captured or generated, and thus in particular to scenes and images wherein specific targets stand out.

The approach may allow distance determination in devices with low computational resource such as mobile devices, or may for example allow a faster distance determination thereby e.g. allowing real time distance determination.

The optical characteristic is a characteristic of the object which may allow the scene object to be discernible in the image when the properties of the image are analyzed (e.g. a bright object in dark surroundings, a dark object in bright surroundings; or a red object in green surroundings). The radiation characteristic may for example be an emission characteristic and/or a reflection characteristic. The optical characteristic may thus be a characteristic of light from the scene object reaching the image capture device.

The coded aperture may for example be provided by a fixed mask comprising a number of openings in an opaque element covering the lens of the image capture device. As another example, the opaque element may be created by a controllable element, such as e.g. a mask formed by a Liquid Crystal (LC) element positioned in front of the lens.

The invention may allow distance determination from a single image thereby avoiding a necessity for a plurality of image sensors, image capture devices etc.

The optical characteristic may be a predetermined or assumed optical characteristic.

In accordance with an optional feature of the invention, the image is a bright pupil image and the optical characteristic is a characteristic of light retroflected by a retina towards the image capture device.

The invention may provide an improved and/or facilitated determination of a distance to a pupil and thus a distance to a human or animal. Specifically, the invention may in many scenarios allow reduced determination of a distance to a person.

The use of a bright pupil image may specifically result in an optical characteristic in the image corresponding to the pupil being easier to detect and/or allowing an easier differentiation to other captured elements of the scene. Indeed, the image objects corresponding to the pupil may be detected using a low complexity criterion. Specifically, an increased difference between image contributions from the pupil and from other elements of the scene may be increased thereby facilitating detection and allowing reduced complexity detection. For example, a simple detection criterion based on brightness and/or e.g. color may be used. Furthermore, a bright pupil image may typically be characterized by the pupil being substantially brighter than surrounding areas thereby allowing the contribution from the pupil to the image to dominate contributions from other positions (parts) of the scene.

The bright pupil image may specifically be one where simultaneous illumination is provided by a light source positioned substantially on the optical axis of the image capture device. For example, the bright pupil image may be captured with an illumination of the scene from a light source positioned within 5° of the optical axis of the image when measured from the pupil.

In accordance with an optional feature of the invention, the receiver is arranged to receive a second image of the scene from the image sensor, the second image being a dark pupil image; and wherein the detector is further arranged to compensate the first image for the second image prior to detecting the at least two image objects.

The invention may provide an improved and/or facilitated determination of a distance to a pupil and thus a distance to a human or animal. Specifically, the invention may in many scenarios allow reduced determination of a distance to a person.

The use of a dark pupil image together with a bright pupil image allows a significant emphasis of the image objects corresponding to pupils. In particular, the compensation of the bright pupil image by the dark pupil image may remove or reduce the contribution from other objects than the pupil. The compensation may result in data reduction in the image that is processed and may facilitate and/or improve the detection of the image objects corresponding to the pupil. Typically, the difference between the image objects corresponding to the bright pupils and other areas of the image will be emphasized. Thus, computational requirements may be reduced and a more reliable detection may be achieved.

Thus the approach may result in an optical characteristic corresponding to the pupil being easier to detect in the image. Indeed, the image objects corresponding to the pupil may in many scenarios be detected using a low complexity criterion. For example, a simple detection criterion based on brightness and e.g. color may be used.

The dark pupil image may specifically be one where no simultaneous illumination is provided by a light source positioned substantially on the optical axis of the image capture device. For example, the bright pupil image may be captured with no illumination of the scene from a light source positioned within 5° of the optical axis of the image when measured from the pupil.

In accordance with an optional feature of the invention, the apparatus further comprises a light source for illuminating the scene, the light source being positioned substantially on an optical axis of the image capture device; and a light source controller arranged to switch on the light source for the first image and to switch off the light source for the second image.

This may provide improved and/or facilitated detection of the image objects and may specifically result in a controlled generation of bright and dark pupil images. Thus, the system may itself illuminate the scene to generate detectable objects that stand out from other objects in the scene.

The switching off (or on) may be a partial switching. Thus, when switched on the light source will be brighter than when switched off. However, some light may still be radiated when the light source is switched to the off state, and the light output in the on state may be less than the maximum possible output from the light source.

In many embodiments the light source may advantageously be an infrared light source.

In accordance with an optional feature of the invention, the at least two image objects correspond to a first pupil of a person and the detector is further arranged to detect a further at least two image objects of the image corresponding to ghost images of a second pupil of the person resulting from different openings of the coded aperture; and wherein the distance estimator is further arranged to determine the distance in response to a displacement in the image of the further at least two image objects.

This may provide improved distance determination in many scenarios. For example, individual distances to the two pupils may be determined and the distance to the head may be determined as the average of these distance estimates.

In accordance with an optional feature of the invention, the at least two image objects correspond to a first pupil of a person; and the detector is further arranged to detect a further at least two image objects of the image corresponding to ghost images of a second pupil of the person resulting from different openings of the coded aperture; and wherein the distance estimator is further arranged to determine an orientation of a head of the person in response to a difference between the displacement in the image of the at least two image objects and a displacement in the image of the further at least two image objects.

The invention may provide an improved and/or facilitated determination of not only a distance to a person's head but also of the orientation of the person's head.

In accordance with an optional feature of the invention, at least two of the at least two image objects are disjoint image objects.

This may improve and/or facilitate distance determination in many scenarios. In particular, the coded aperture may be generated such that openings of the coded aperture results in non-overlapping image objects for an object within a specified distance interval.

In accordance with an optional feature of the invention, the apparatus further comprises a light source for illuminating the scene, the light source having a characteristic arranged to emphasize the optical characteristic of the scene object.

This may in many scenarios improve and/or facilitate the distance determination. The system may introduce lighting which is specifically adapted to increase differentiation between the object and other components in the scene.

The system may thus actively introduce optical differentiation between objects in the real world thereby allowing the subsequent image processing to more easily identify image objects of ghost images for a desired object. The increased differentiation combined with ghost images created by the coded aperture may substantially improve and/or facilitate the determination of distance from a single image.

In accordance with an optional feature of the invention, the characteristic is at least one of: a position of the light source; a frequency distribution of light radiated from the light source; a spatial distribution of light radiated from the light source; and a polarization of light radiated from the light source.

This may in various scenarios provide particularly advantageous performance by emphasizing specific optical characteristics.

In accordance with an optional feature of the invention, the coded aperture is formed by a number of disjoint openings, each opening resulting in a ghost image of the scene object.

This may provide an improved and/or facilitated distance determination. It may further allow for facilitated and/or low cost implementation.

In accordance with an optional feature of the invention, the number is less than five.

This may provide an improved and/or facilitated distance determination in many embodiments.

In many embodiments, it may be particularly advantageous to have only two openings in the coded aperture as this may be the lowest number of openings allowing a distance determination based on displacement between ghost images. Thus, it may minimize complexity of both processing and hardware implementation in many embodiments.

In many embodiments, it may be particularly advantageous to have openings in the coded aperture which are substantially vertically aligned. This may be particularly advantageous when detecting ghost images corresponding to a being's eyes as it may reduce or eliminate the probability of the ghost images of the right and left eyes overlapping.

In accordance with an optional feature of the invention, each opening has an inferometric pattern; and the apparatus is arranged to determine the displacement in the image of the at least two image objects in response to an inference pattern of the inferometric pattern of at least two openings.

This may provide an improved and/or facilitated distance determination in many embodiments. In particular, it may facilitate determination of displacements between image objects in case these are overlapping. In many embodiments, the apparatus may be arranged to determine whether the image objects are overlapping and to apply the interference based displacement determination (only) if they are overlapping.

The inferometric pattern may specifically be a zone plate pattern.

According to an aspect of the invention there is provided a system for determining a distance to a scene object, the system comprising: an image capture device having a coded aperture and an image sensor, the image sensor being positioned out of a focus plane for the scene object; a receiver for receiving a first image of a scene from the image sensor; a detector for detecting at least two image objects in the image corresponding to ghost images of the scene object resulting from different openings of the coded aperture in response to an optical characteristic of the scene object, the optical characteristic being a radiation characteristic of the object towards the image capture device; and a distance estimator for determining a distance to the scene object in response to a displacement in the image of the at least two image objects.

According to an aspect of the invention there is provided a method of determining a distance to a scene object, the method comprising: receiving a first image of a scene from an image sensor of an image capture device having a coded aperture, the image sensor being positioned out of a focus plane for the scene object; detecting at least two image objects in the image corresponding to ghost images of the scene object resulting from different openings of the coded aperture in response to an optical characteristic of the scene object, the optical characteristic being a radiation characteristic of the object towards the image capture device; and determining a distance to the scene object in response to a displacement in the image of the at least two image objects.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a system for determining a distance to a human being and in particular to determination of a distance to the eyes of a human from a bright pupil image. However, it will be appreciated that the invention is not limited to this application but may be applied to determination of a distance to many other objects based on many different optical characteristics.

Figure 1:
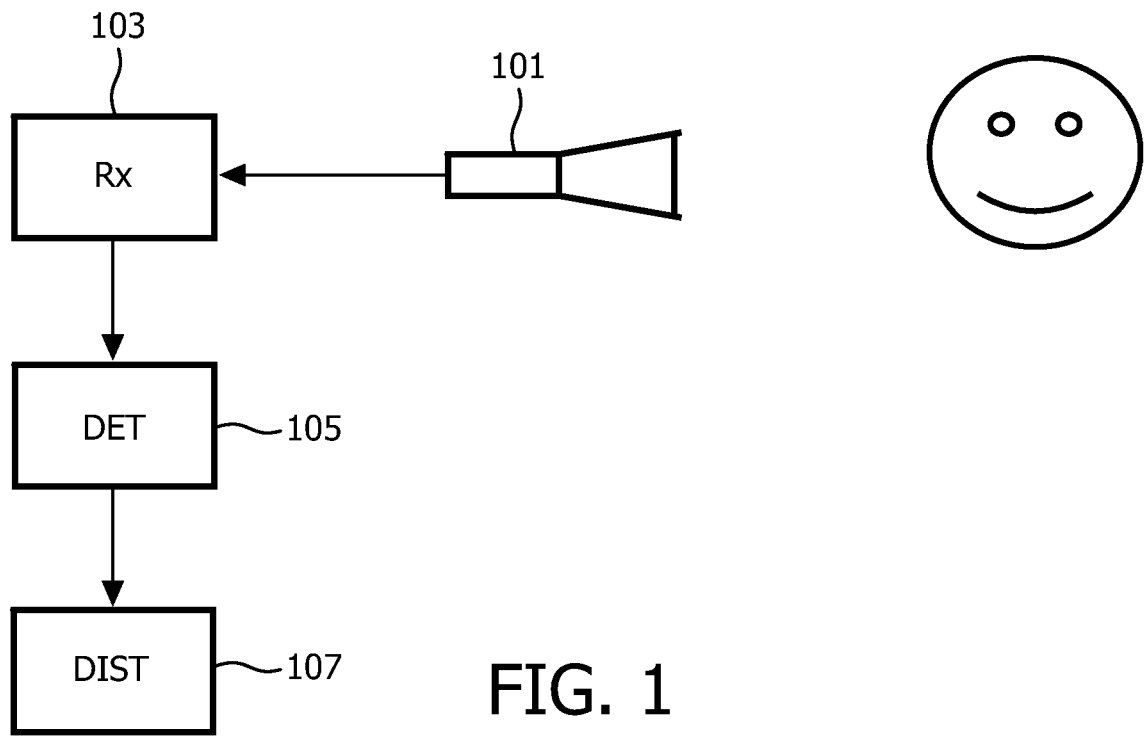
FIG. 1 illustrates an example of elements of an apparatus for determining a distance to an object in accordance with some embodiments of the invention.

FIG. 1 illustrates an example of a system for determining a distance to an object from a single captured image.

An image capture device 101 is arranged to capture an image of a scene in which the object is present. The image capture device 101 comprises a coded aperture which provides a mask for the incident light on the image sensor of the image. Further, the image sensor is positioned out of the focus plane such that the coded aperture provides a blurring of the captured image. A coded aperture is an aperture which comprises a plurality of openings. The coded aperture applies an optical mask to the conventional single opening aperture. In the system of FIG. 1, the coded aperture is such that ghost images (multiple copies) of the objects are generated. A feature of these ghost images is that the displacement between them is proportional to the distance to the object.

The image capture device 101 is coupled to a receiver 103 which receives the image from the image sensor. The receiver 103 is coupled to a detector 105 which is arranged to detect at least two image objects in the image which correspond to ghost images of the object resulting from different openings of the coded aperture. The detection is based on an optical characteristic of the object. Thus, the detector may identify two (or possibly more) image objects (areas) that are ghost images/copies of the specific object to which the distance is being estimated. The image objects can be determined by detecting the presence of a specific optical characteristic, such as a color, brightness, or pattern.

The detector 105 is coupled to an estimator 107 which determines a displacement in the image between the two (or more) image objects. The estimator then proceeds to estimate the distance to the object from the determined displacement.

The operation of the system of FIG. 1 will in the following be described with focus on an application wherein the object is one or both eyes of a human. Furthermore, the image is a bright pupil image and the distance determination is based on evaluating ghost images of at least one pupil.

When an image sensor is positioned outside of a focus plane, the characteristics of the defocus blur depend on the characteristics of the aperture as well as the distance to the objects in the scene.

Figure 2:
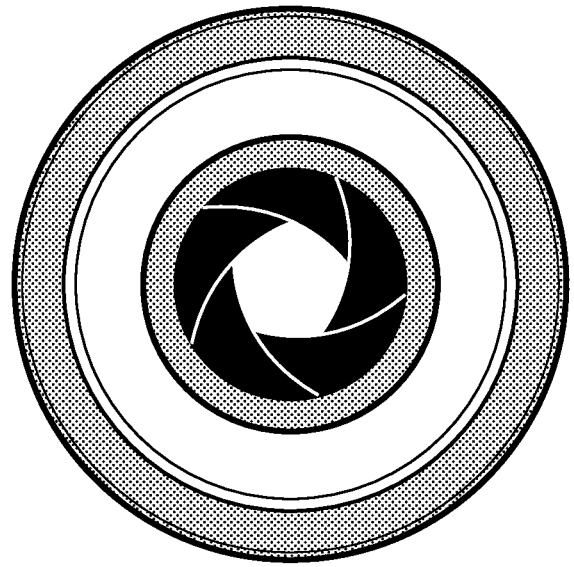
FIG. 2 illustrates an example of an aperture of an image capture device in accordance with prior art.
Figure 3:
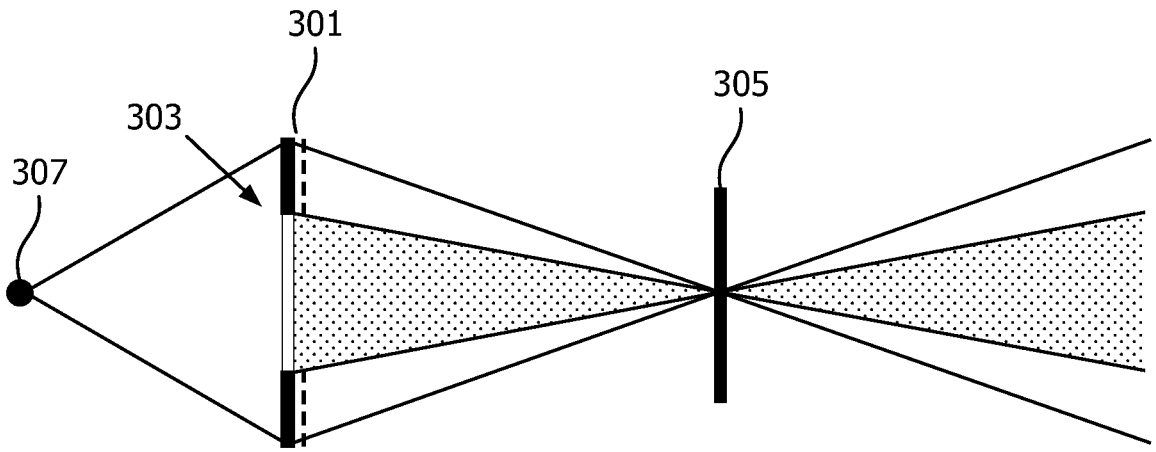
FIG. 3 illustrates an example of light ray distribution from an object for the aperture of FIG. 2.

Indeed, in conventional photography, the shape of the lens aperture determines the properties of the blur kernel. For example, a typical shape of a conventional lens aperture is shown in FIG. 2. FIG. 3 illustrates a cross section of an image capture device comprising a lens 301 with an aperture 303 and an image sensor 305 positioned exactly at the focus plane. As illustrated, all light radiated from a given object plane 307 is focused by the lens 303 to coincide at the same spatial point of the image sensor 305 at the focus plane. Thus, in this scenario, the lens collects light rays originating from the object and propagating in slightly different directions and refracts them in such a manner that they are constructively combined onto the image sensor 305.

Figure 4:
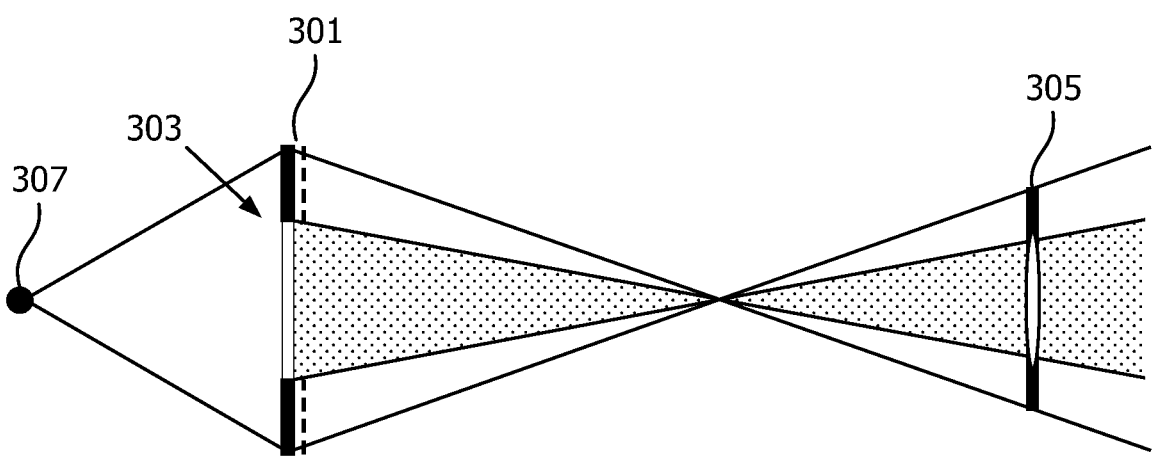
FIG. 4 illustrates an example of light ray distribution from an object for the aperture of FIG. 2.

FIG. 4 illustrates the same image capture device but with the image sensor positioned outside of the sensor plane. In this case, the light rays from a single point are blurred over an area, and indeed the resulting image corresponds to a convolution of the scene image by a blur kernel corresponding to the aperture. The defocus blur kernel is a scaled representation of the lens aperture, and thus the light rays from a single point will be distributed over an image area corresponding to the blur kernel. The image at a given point of the image sensor will correspond to a combination of the light from the different positions that after convolution by the blur kernel have a contribution to the point. If the lens aperture is a circular opening, the blur kernel will resemble a uniform disk which will have a corresponding sinc-like spectral behavior in the spatial domain. As sinc-functions exhibit zeroes, some spatial frequencies are lost during acquisition and cannot be recreated by any image restoration procedure. The extent of the blur kernel is related to the amount of defocus blur and hence the object distance. However, in order to calculate this object distance based on the defocus blur of a single aperture, it is necessary to have information about the size of the objects. As such information is typically not present, or is unreliable, the resulting distance estimate will typically also be unreliable. Furthermore, the signal processing required to extract and determine the actual defocus blur characteristics in the captured image is very difficult and complex.

It has been proposed in A. Levin, R. Fergus, F. Durand, W. T. Freeman. "Image and Depth from a Conventional Camera with a Coded Aperture", SIGGRAPH, ACM Transactions on Graphics, August 2007 to use a complex broadband coded aperture mask to perform a spectral patterning of the image which can be used to determine the defocus blur from which the distance can be calculated. However, this processing is very complex and resource demanding and tends to provide suboptimal results.

Figure 5:
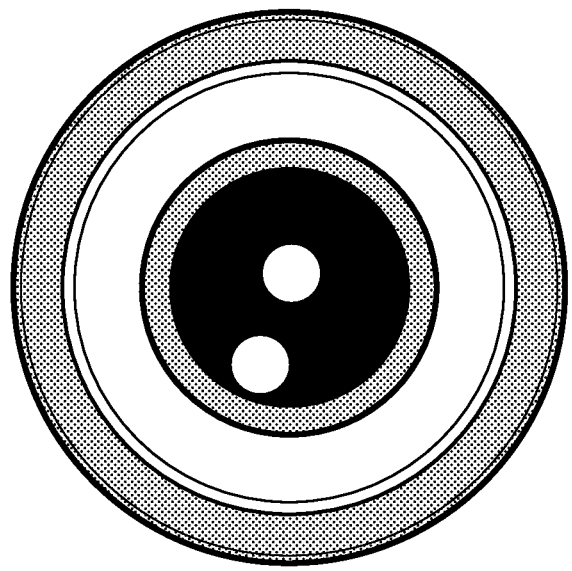
FIG. 5 illustrates an example of a coded aperture of an image capture device in accordance with some embodiments of the invention.

In the system of FIG. 1, a lens with a coded aperture is used wherein the coded aperture is a very simple mask comprising only two openings as illustrated in FIG. 5. In the system, the lens aperture is used to shape the characteristics of the defocus blur. As opposed to shaping the spectral properties of defocus blur using a broadband masks (as in the system of the referenced article), the system of FIG. 1 uses a coded aperture that allows a very simple, pragmatic analysis of the defocus blur.

Figure 6:
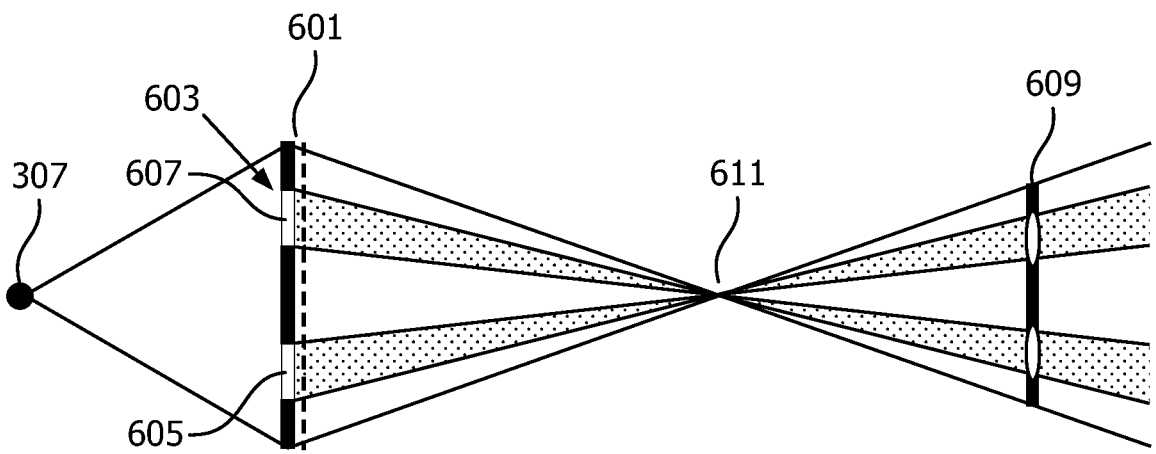
FIG. 6 illustrates an example of light ray distribution from an object for the coded aperture of FIG. 5.

FIG. 6 illustrates a cross section of the image capture device 101 of FIG. 1. The image capture device 101 comprises a lens 601 with a coded aperture 603 having two openings 605, 607 and an image sensor 609 positioned out of the focus plane 611.

As illustrated in FIG. 6, the coded aperture consisting of two vertically displaced circular openings can result in an out-of-focus imaging which results in multiple copies or ghost images being created for the object. Indeed, each opening can be considered to provide an individual blur kernel which is spatially offset relative to the blur kernel of the other opening. As illustrated, a given object will accordingly be represented by ghost images/multiple representations in the image captured out of the focus plane. The coded aperture and the properties of the image capture device 101 may specifically be designed such that for an object within a target distance interval, the image objects corresponding to the different ghost images may be non-overlapping image objects.

The displacement between the different image objects depends on the distance between the openings in the coded aperture and the distance to the scene object that the image objects correspond to. Since the distance between the openings in the coded aperture is known, the system of FIG. 4 can determine the displacement between image objects corresponding to the object for which the distance is to be determined, and can then proceed to determine the distance based on the displacement.

Thus, since the distance between the ghost images is indicative of the amount of defocus and therefore of the distance to the object of the ghost images, the displacement of the image objects relative to each other (the distance between them in the image) can be converted into an object distance without a priori knowledge about the objects dimensions. This approach reduces the estimation of defocus blur to the simple task of estimating the displacement of associated ghost images. The aperture codes can be further optimized to even simplify the requirements for the image processing algorithm even more. For example, employing two vertically displaced cross patterns may enable implementations on low-power devices at the expense of the light-efficiency of the system.

Furthermore, since the distance determination is based on a low complexity displacement determination between image objects corresponding to the object to which the distance is to be estimated, the image analysis may be based on a low complexity detection of these specific image objects in the image from the image sensor. In the system of FIG. 1, the detector 105 is arranged to detect the image objects based on an optical characteristic of the object. The optical characteristic may be a predetermined known or assumed optical characteristic which can differentiate the object from other elements of the scene. For example, the optical characteristic may be a brightness, pattern or color of the object.

The detector may accordingly search the captured out of focus image to identify image segments/areas that have characteristics corresponding to the optical characteristic of the image. For example, the detector 105 may search the image to find image areas wherein the color corresponds sufficiently closely to that of the object.

In order to facilitate this detection of image objects corresponding to ghost images, the scene may be controlled or may be restricted such that the object has optical characteristics that clearly allows detection of corresponding image objects in the captured out of focus image. For example, in some embodiments the object may be the only bright object in the scene or may e.g. be the only red object in the scene. In such scenarios, the detector 105 may simply search for image areas that are brighter than a threshold (which e.g. may dependent on the average brightness of the image) or which comprise a red color component.

Although the blurring effect will cause such image areas to also comprise contributions from other positions, and thus other elements of the scene, such a low complexity approach may often still be useful. For example, if the object is the only red object in the scene, the image objects corresponding to the ghost images thereof will be the only areas having a red color component. This can be detected even if the actual color of these image areas differ from the red color of the object due to the contribution from other objects in the scene. Indeed, the detection may be facilitated and the differentiation made clearer by e.g. illuminating the scene by a light having a red color.

Thus, the system of FIG. 1 determines the distance to an object by detecting multiple image objects/segments that correspond to the object based on an optical property of the object. The distance is then calculated from the displacement/distance between these image objects. Hence, no complex image de-blurring signal processing is required and a reliable distance estimate can be generated with very low complexity. The approach is particularly suitable for controlled scenes wherein the object is clearly differentiable, and for coded apertures with a low number of openings resulting in the ghost images.

A particularly advantageous scenario is when the object is an eye (or head) of a human or animal, and the distance determination is based on a bright pupil image. As will be known to the person skilled in the art, a bright pupil image is an image that includes a reflection of a light source of the retina of an eye. This reflection causes the pupil to appear brighter, and often it may result in the pupil appearing substantially brighter than surrounding areas. A well-known example of bright pupil imaging is the red-eye effect that may occur during conventional flash photography.

The bright pupil image may specifically be an image captured with a light source positioned substantially at the optical axis of the image capture device. Indeed, a bright pupil image may be generated by providing image capture device on-axis lighting. Specifically, a bright pupil image may e.g. be generated by providing a light source which illuminates the eye from a position within 5° of the on-axis direction when measured from the eye. The illumination may specifically be an infrared illumination which often provides an increased bright pupil effect.

Figure 7:
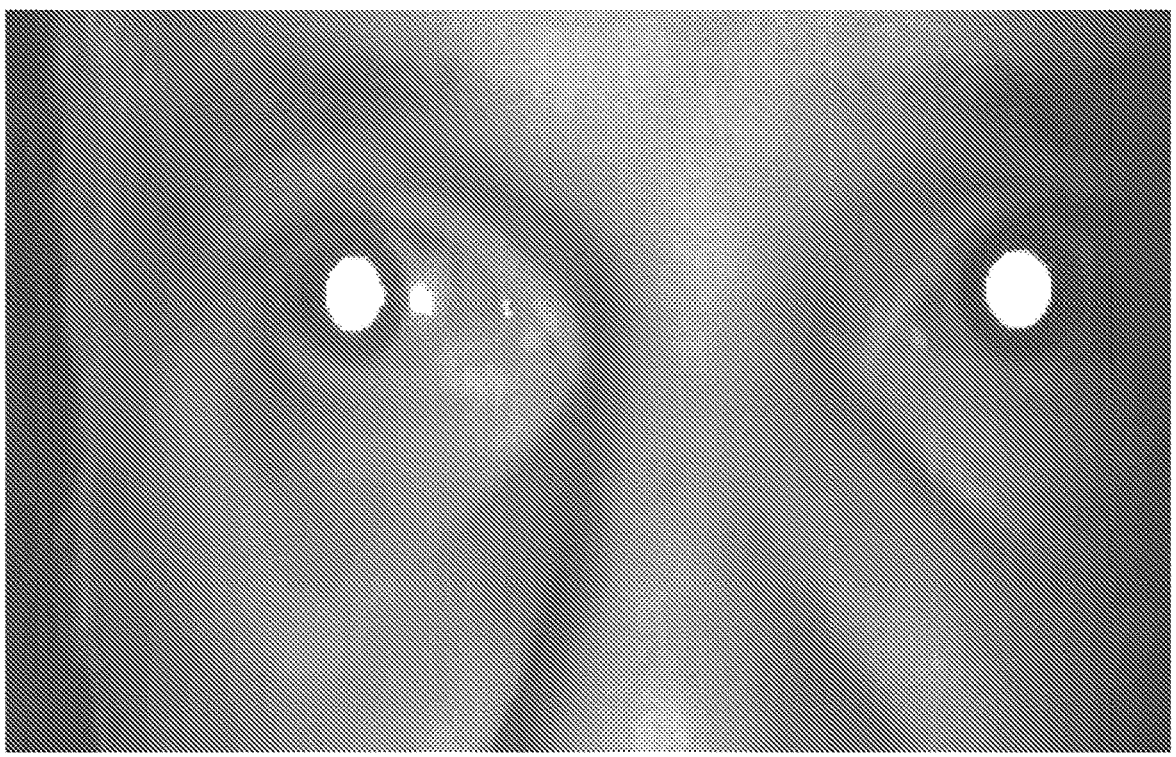
FIG. 7 illustrates an example of a bright pupil image.

An example of a bright pupil image is given in FIG. 7. As can be seen, the pupils of a bright pupil image may typically stand out very clearly from the remaining image. This may be exploited in the system of FIG. 1 by specifically targeting the bright pupils.

Figure 8:
FIG. 8 illustrates an example of a bright pupil image captured by an image capture device in accordance with some embodiments of the invention.

Specifically, FIG. 8 illustrates an example of a bright pupil image captured using the image capture device 101 with a coded aperture corresponding to FIG. 6. As can be seen, the use of a bright pupil image may substantially facilitate the detection of image objects corresponding to a desired object by providing targets that differentiate substantially from the remaining image.

In the example, the detector 105 is arranged to look for an optical characteristics which is a bright pupil characteristic. In the example, the characteristic may simply be a brightness characteristic. Thus, in the specific example, the detector 105 may search the image of FIG. 8 to identify the four image objects corresponding to the pupils of the person imaged. The image objects may simply be determined as the (e.g. four largest) consecutive image areas having a brightness that exceeds the average brightness level of the image by more than a given amount. Subsequently, the estimator 107 may find the center of the image objects and the distance between the two pairs of ghost images, e.g. it may determine all distances between the centers and select the two shortest distance. The average displacement may then be calculated as the average of the two shortest image object distances.

After the displacement of the image objects corresponding to the ghost images has been calculated, the estimated distance to the pupils, and thus to the person, may be calculated from the equation:

$$\frac{1}{v} + \frac{1}{b} = \frac{1}{f},$$

where v is the object distance, b is the image distance (position where the object would be imaged in focus, both wrt lens) and f is the focal distance. The defocus blur kernel is a scaled version of the aperture pattern itself of which the size is proportional to the displacement of the image sensor to the image plane (ref FIG. 6). Defining x as the distance between the lens and the image the size of the blur kernel K can be defined as:

$$K(x) = A\left\|\left(\frac{x-b}{b}\right)\right\| = A\left\|\frac{x - \left[\frac{1}{f} - \frac{1}{v}\right]^{-1}}{\left[\frac{1}{f} - \frac{1}{v}\right]^{-1}}\right\|,$$

where A is the aperture itself (at x=0).

It is worth noting that the blur size is proportional to the distance of the image sensor to the image plane. If the sensor is focused in the middle of the scene, it is difficult to discriminate objects that are in front of the focus plane from those behind it. For depth estimation it is therefore often beneficial to focus the sensor in front of the entire scene, such that the resulting blur is proportional to distance directly.

In some embodiments, the detector 105 may be arranged to determine the image objects in response to both a bright pupil image and a dark pupil image. The dark pupil image is an image which is not a bright pupil image, i.e. where no specific retina reflection is present to generate pupils which appear brighter due to the reflection. Specifically, the receiver 103 may receive a bright pupil image and a dark pupil image captured substantially simultaneously (or such that movement of the pupils during the time difference is negligible) by the image capture device 101. The detector 105 may then compensate the bright pupil image by the dark pupil image to generate a compensated bright pupil image which is searched to identify the appropriate image objects.

This approach thus uses the fact that co-axial illumination and imaging results in a strong retro-reflective signal off the retina. This is absent in images captured using illumination that is sufficiently offset from the optical axis of the imaging device. By compensating the bright pupil image by the dark pupil image it is possible to further enhance the differentiation caused by the bright pupils.

The compensation may specifically be a subtraction of the dark pupil image from the bright pupil image. Specifically, a subtraction may be performed in the luminance or chrominance domain, e.g. by subtracting the individual pixel values in each luminance, chroma or chrominance color channel.

Figure 9:
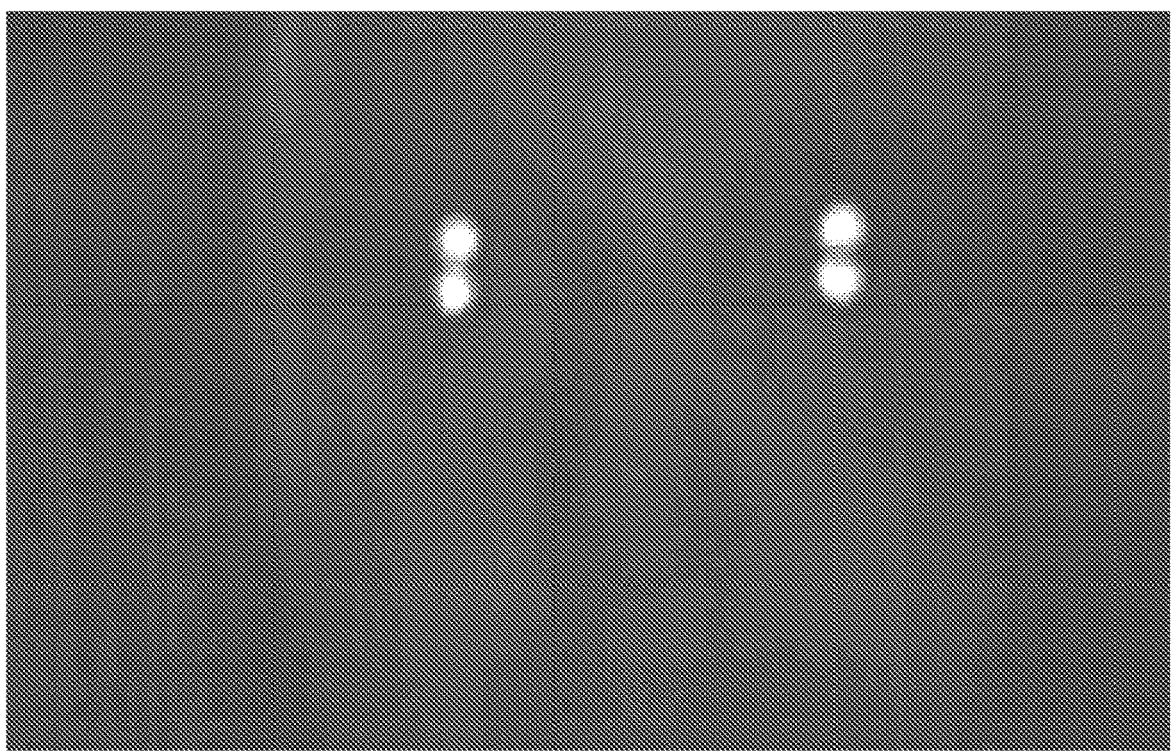
FIG. 9 illustrates an example of a compensated bright pupil image captured by an image capture device in accordance with some embodiments of the invention.

Although such a subtraction may not remove all image contributions that do not result from the reflection (e.g. due to differences in the lighting etc), it will tend to reduce these contributions substantially. An example of a bright pupil image generated by such compensation is illustrated in FIG. 9. As can be seen (e.g. in comparison to the image of FIG. 8), the image signal outside the image objects corresponding to the bright pupils has been substantially attenuated. This signal attenuation allows a much simpler and more reliable detection of the image objects corresponding to the ghost images of the bright pupils. Indeed, by compensating the bright pupil image by the dark pupil image, the image data that is processed may be considered to become very sparse in the sense that the resulting data exhibit only weak signals except at the location of the pupils. This sparseness allows the simple coded aperture to be used to effectively provide ghost images that can be used to determine the distance to the person.

The system may consider image objects corresponding to only a single pupil, or may in other embodiments or scenarios consider image objects corresponding to two pupils. For example, as previously described, two displacement measures may be generated based on image object pairs where each image object pair corresponds to the two image objects arising from a single pupil. The matching between image objects and pupils can easily be done by considering the locations and the coded aperture. For example, for two vertically positioned openings, the image objects with the smallest vertical distance may be assumed to be ghost images of the same pupil. The two displacements may then be averaged and the distance may be determined based on the averaged displacement (or equivalently two distances may be calculated and averaged). It will be appreciated that in some embodiments a weighted averaging may be performed, e.g. dependent on a reliability estimate for each detected image object.

Figure 10:
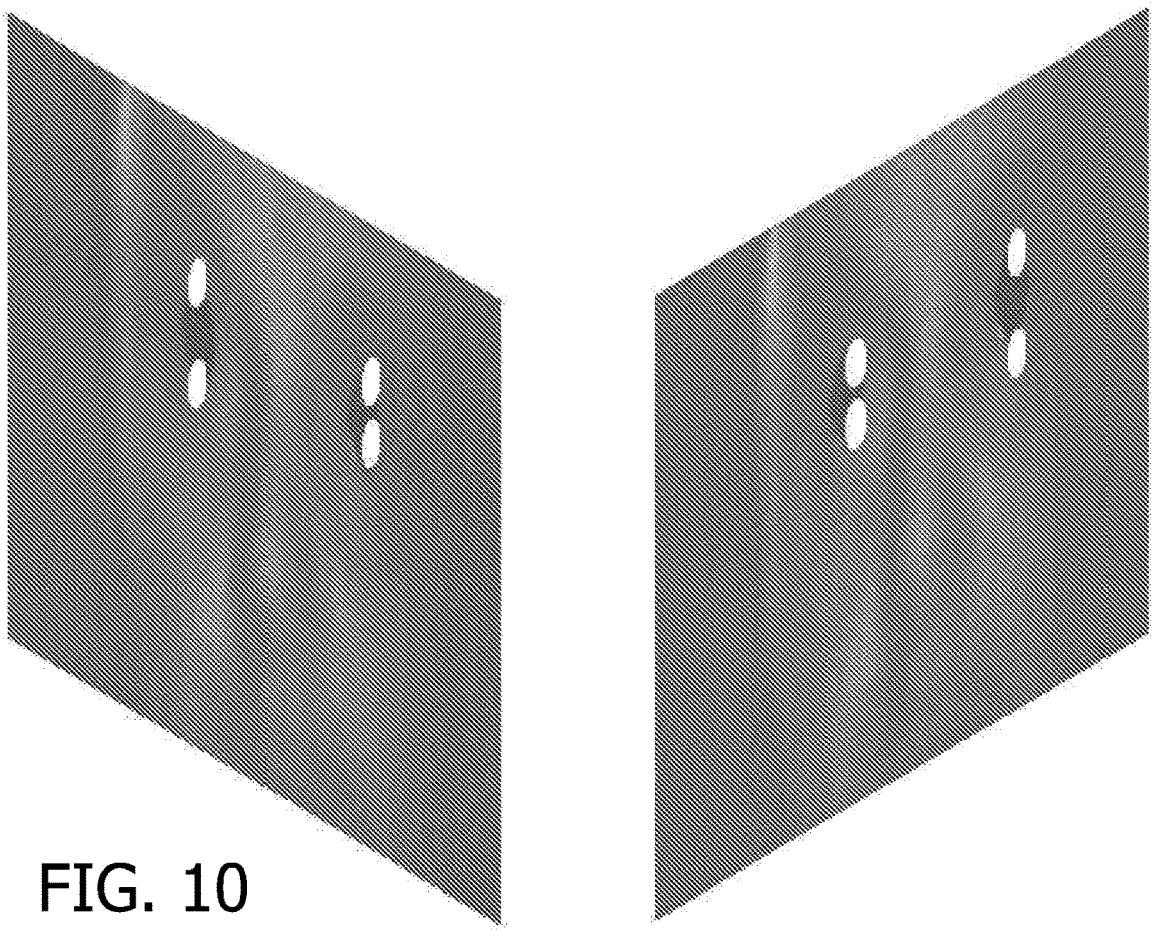
FIG. 10 illustrates examples of a compensated bright pupil image captured by an image capture device in accordance with some embodiments of the invention.

Alternatively or additionally, the two detected displacements for the two pupils may be used to determine an orientation of the head of the person. Thus, by analyzing the distance to the eyes in a human face individually, the head orientation can be derived from the range difference of the eyes. The orientation of the head may be determined based on the estimated distances or may directly be determined from displacements. The principle may be illustrated by the example images of FIG. 10. When both eyes have identical ghost image displacements, the head is oriented perfectly towards the camera (as in the example of FIG. 9). However, when either ghost pair is closer than the other, the head is turning to its right or left respectively (as in the examples of FIG. 10). The degree of turning can be determined from the difference in the displacement, and the direction of the turning is given by which displacement is the largest.

Figure 11:
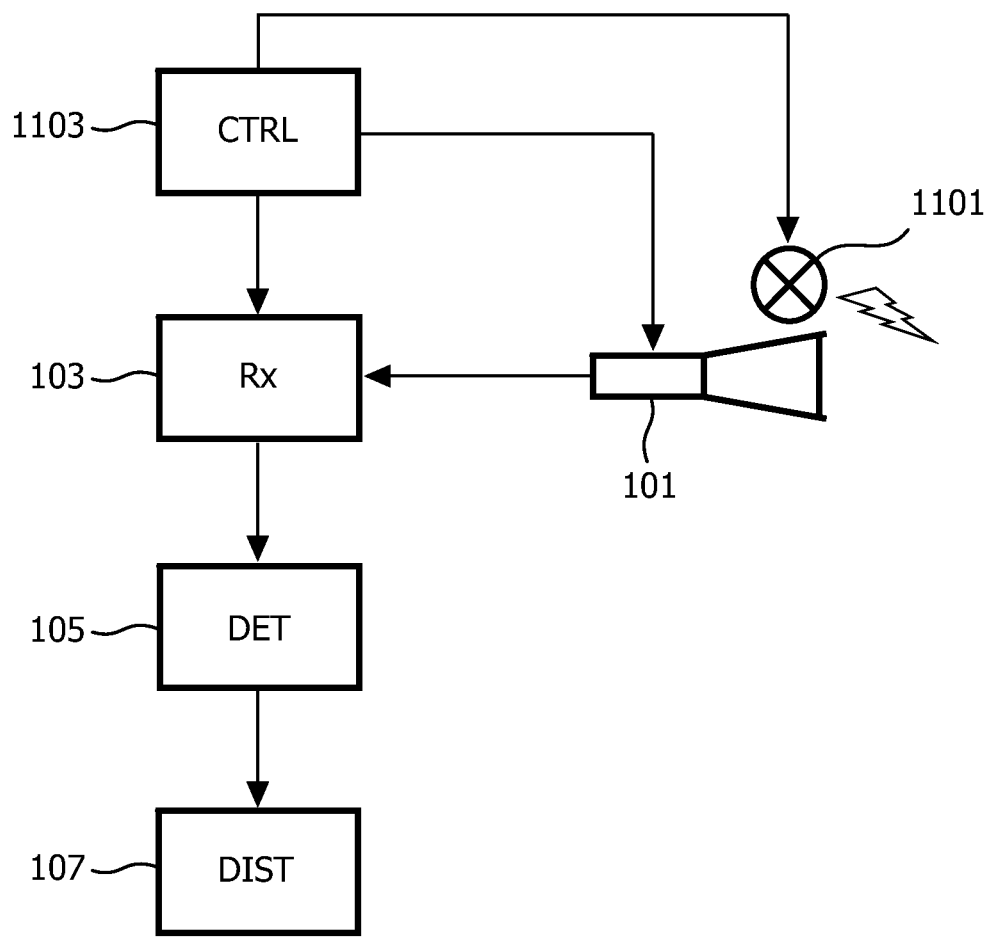
FIG. 11 illustrates an example of elements of an apparatus for determining a distance to an object in accordance with some embodiments of the invention.

In some embodiments, the system may comprise an active light source for generating the bright pupil images as well as a controller for controlling the light source such that both bright and dark pupil images can be generated. An example of such a system is illustrated in FIG. 11 and corresponds to the system of FIG. 1 except that a light source 1101 (in the specific example in the form of a flash) is included. The light source 1101 is positioned substantially on the optical axis of the image capture device 101. The system further comprises a controller 1103 which is coupled to the light source 110, the image capture device 101 and to the receiver 101.

The controller 1103 may first control the receiver 101 and image capture device 101 to capture an image without the light source being switched on. This image will be a dark pupil image. The controller 1103 may then control the receiver 101 and image capture device 101 to capture a second image but this time the controller 1103 controls the light source 1101 such that a flash is generated simultaneously with the image being captured (or shortly before). Since the light source 1101 is positioned on the optical axis of the image capture device 101, this light will be reflected of the retinas resulting in a bright pupil image.

The system of FIG. 1 (and FIG. 11) is based on an image capture device 101 using a coded aperture. A low complexity coded aperture is used to generate ghost images of distinctive features (such as the pupils) allowing the distance determination to be based on a low complexity ghost image displacement (offset). In many embodiments, the coded aperture is formed by a number of disjoint openings where each opening results in a ghost image of the object. Typically only a few and specifically no more than five openings are used thereby reducing the number of ghost images, and thus the required complexity of the detection and processing of the corresponding image objects. This may further reduce the interference between the images of the different openings and may result in more accurate, robust and reliable distance determination. In many embodiments, the coded aperture may have only two openings. This will provide two ghost images and thus be sufficient to allow the distance determination while minimizing or at least reducing the complexity of processing and the ghost image cross talk between ghost images from different openings.

Specifically, using only a few openings, and in particular using only two openings, may increase the data sparsity of the image being processed. When this is combined with a scene that results in an image which is sparse (either as captured or after processing) a particularly efficient, reliable, low complexity and low resource demand operation can be achieved.

Such coded apertures consisting in a low number of openings will typically not be suitable for conventional imagery as it would result in ghost images of the whole scene at variable distances, all superimposing on each-other. Such contributions will for many conventional images be very difficult and complex to resolve and separate, and will require very complex algorithms and approaches. However, the inventors have realized that for many scenes, a low complexity identification of specific image objects corresponding to ghost images of specific objects is possible even after such blurring, and that detection of such image objects can be used to determine a distance to an object. The approach works particularly well when a sparse image can be generated where the specific image objects stand out. Such sparse images can e.g. be generated by the scene being a suitable scene (e.g. with the only bright elements being of the relevant object (such as headlights of a car in the dark), by specific illumination (such as coaxial illumination to generate bright eyes) or by compensation of the captured image (e.g. by using a dark pupil image), or of course by a combination of these approaches. Indeed, in some embodiments, the approach may be used in an application where it is only assumed that the scene can result in a sparse image. If the scene meets this assumption, the algorithm will provide reliable results (e.g. when detecting headlights in the dark). If the scene does not meet the assumption (e.g. for the same scene during the day and with headlights switched off), the algorithm may not be able to provide accurate estimates. However, in many applications, this may be acceptable, i.e. a low complexity algorithm that sometimes (but not always) provides reliable estimates may be fully acceptable.

In many scenarios and embodiments, the system may be designed such that the image objects corresponding to the specific object (e.g. pupil) will be disjoint/non-overlapping image objects (e.g. for a given distance range). This will substantially facilitate the detection as well as the determination of the displacement between the image objects.

However, in some embodiments, the image objects may be allowed to overlap (e.g. even within the operating distance range in which the apparatus is required to function). In such embodiments, the displacement may be based on assumptions of the object geometry as well as the opening geometry. For example, for pupils and circular openings, the ghost images are known to be substantially circular. Therefore, the detector may be arranged to search for circular image objects while allowing these to be overlapping. For example, a bright ellipsoidal image area may be resolved as two circular image objects.

Figure 12:
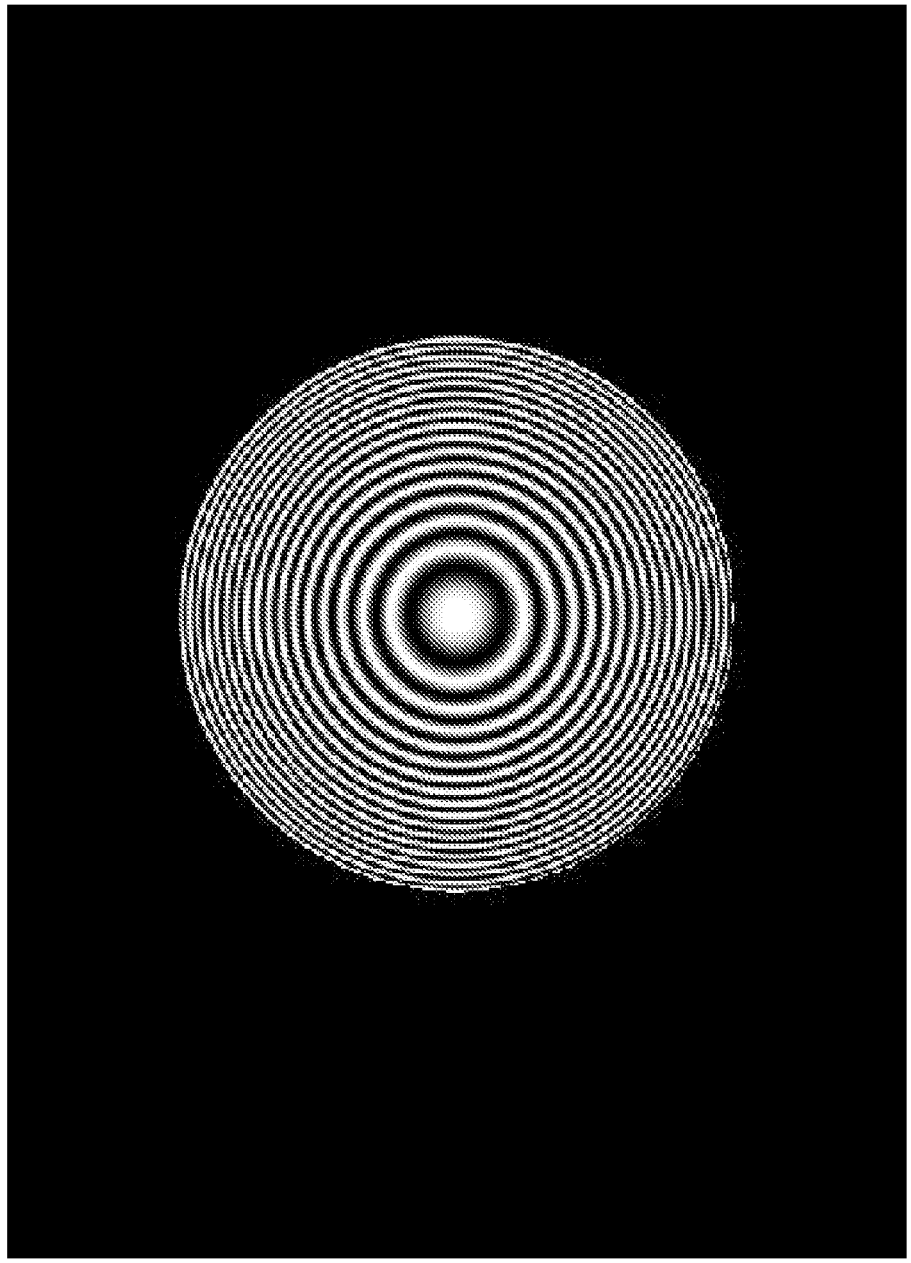
FIG. 12 illustrates an example of a zone plate inferometric pattern in accordance with prior art.
Figure 13:
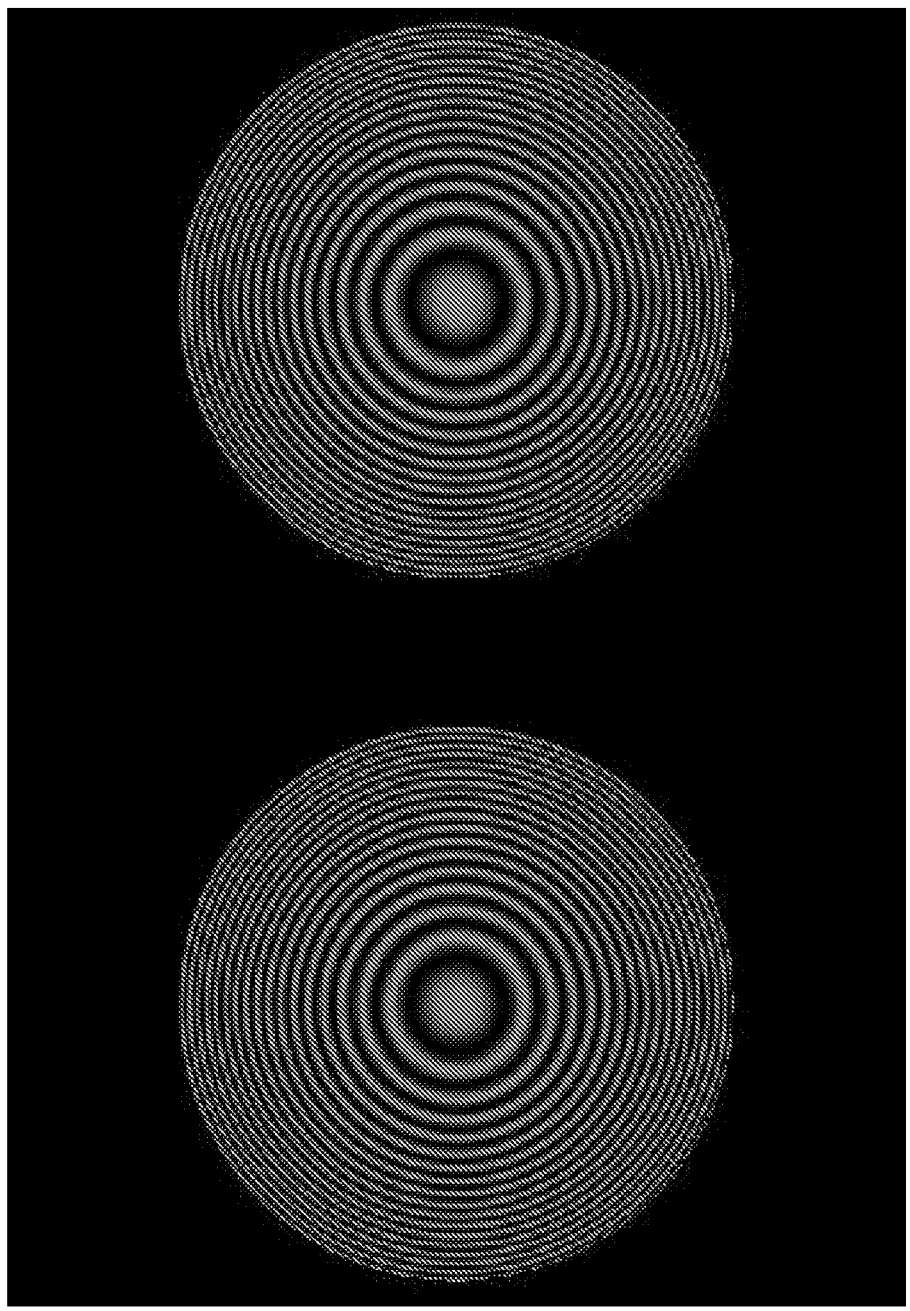
FIG. 13 illustrates an example of an image captured by an image capture device in accordance with some embodiments of the invention.
Figure 14:
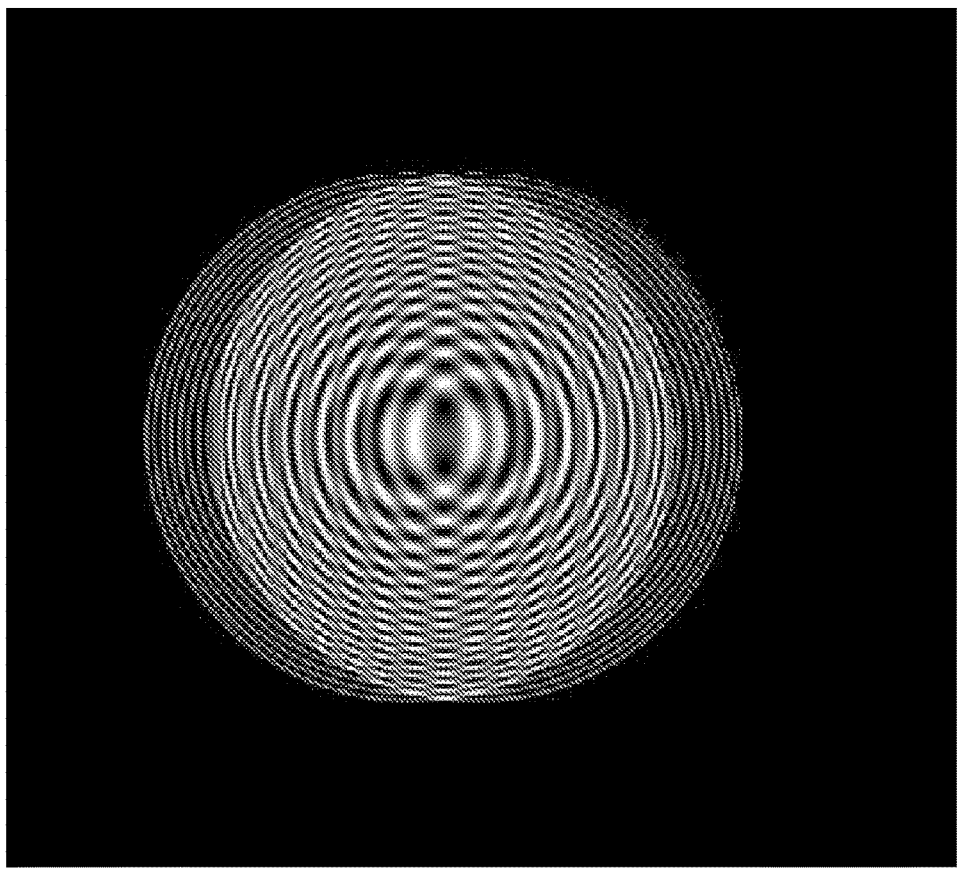
FIG. 14 illustrates examples of images captured by an image capture device in accordance with some embodiments of the invention.
Figure 14:
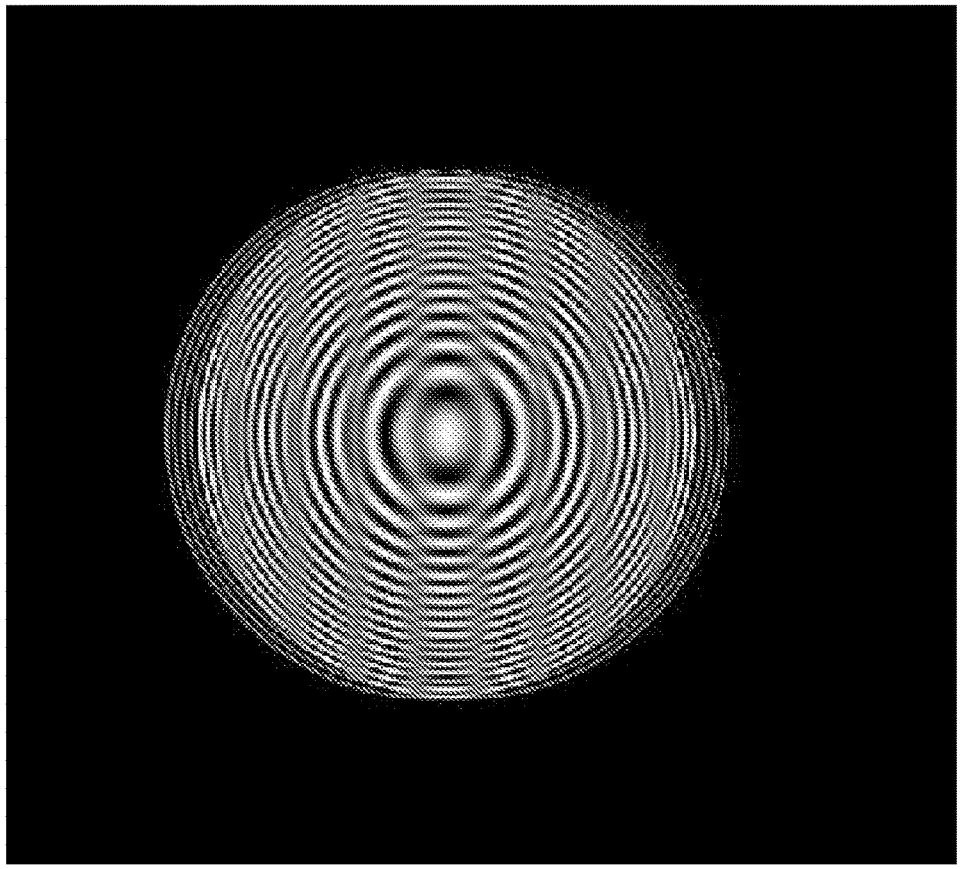

However, in some embodiments each opening may form an inferometric pattern. For example, each opening may be formed as a zone plate inferometric pattern as illustrated in FIG. 12. For a sufficiently large displacement, the corresponding ghost images modulated by the zone plate pattern will still be disjoint image objects as illustrated in FIG. 13. In this case, the displacement may simply be determined as the distance between the centers of the objects. However, when the displacement is reduced such that the image objects begin to overlap (as illustrated in the two examples of FIG. 14), the displacement may be determined by analyzing the resulting interference pattern. For example, in the example of FIG. 14, the displacement can be determined from the distance between the grey lines that appear in the interference pattern. This in turn, can easily be detected by projecting/summing the signals in the horizontal direction. As the grey lines add up constructively, these will form peaks in the resulting one dimensional signal, of which the distance can be readily found using cross-correlation or other well-known methods.

It will be appreciated that although the previous embodiments have focused on detection of distances to pupils based on a bright pupil image (and optionally a dark pupil image), the approach can be used in many different applications and environments and for detection of distances to many different objections.

As an example, the approach may be used to determine a distance to a car. E.g. the described principles could be used in a speed camera designed to operate e.g. in a country road during the hours of darkness. In this case, when a car approaches, the camera will be presented with a scene that is mostly dark except for the headlights of the approaching car. These headlights can due to the coded aperture create ghost images in a captured image. The ghost images can be identified simply by searching for bright image objects and the displacement determined from the identified objects can be used to calculate the distance to the car. If two (or more) images are captured with a known time difference, the corresponding distances can be calculated and the speed of the car can be calculated therefrom.

The apparatus is particularly suitable for use in applications wherein the scene is such that the ghost images of the desired image have optical characteristics that differentiate substantially from the other components of the scene.

In particular, the scene may be passively controlled, such as limiting the operation of the speed camera to the hours of darkness. However, in other embodiments, the system may comprise a light source which illuminates the scene in such a way that the radiated light emphasizes the optical characteristic of the object, and specifically such that the difference between the optical characteristic of the object and optical characteristics of other elements (e.g. background) in the scene is increased.

This may for example be achieved by the positioning of the light source. For example, as previously described, the light source may be positioned on the optical axis of the camera such that reflection of the retina is achieved to generate brighter pupils. Another example may be to position the light source such that objects that have similar optical characteristics (e.g. the same color) as the desired object are positioned in the shade. Such an approach may be suitable for an application wherein the environment is sufficiently static and well known at the set-up phase.

In some embodiments, the frequency distribution of light radiated from the light source may be arranged to emphasize an optical characteristic of the object when captured by the image capture device 101. For example, infrared light may be used to create a more significant bright pupil effect. As another example, for an object which is substantially white, ultraviolet light may be used to further emphasize the ghost images of the object in the captured image. In other embodiments, more subtle frequency distributions may be used to specifically emphasize a specific chroma of the object relative to other objects.

In some embodiments, a spatial distribution may be used to highlight objects. For example, if an approximate position of the object is known or assumed, the light source may be aimed in the direction of the position with less light being radiated in other directions.

In some embodiments, a polarization of light radiated from the light source may be used to emphasize the differentiating optical characteristic of the object in the captured image. For example, if the object comprises a polarizing filter, the reflection may be substantially higher for correctly polarized light than the reflection of other objects. This may e.g. occur when using a polarized light source illuminating a reflector. A perfect mirror wouldn't alter the polarization of light while all other diffusively reflecting surfaces would.

In some embodiments, one or more objects to which the distance is to be detected may be provided with a feature that provides a particular optical characteristic which can be detected in the captured image. This may allow detection of the image objects corresponding to the ghost images generated by the coded aperture. For example, specific light radiating or light reflecting elements may be positioned on objects, and the system may be arranged to detect the corresponding image objects in the captured image.

As a specific example, the system may be used in an application wherein industrial robots are used in a warehouse. The industrial robots may be arranged to move (freely or on tracks) within the warehouse to select and pick up specific items which are then moved to other specific positions. Specifically, orders may be automatically packed using industrial robots arranged to pick the items corresponding to the order from their individual storage position in the warehouse. In such applications, it is important to keep track of the robot's positions and this may be achieved by using one or more devices corresponding to that of FIG. 1.

Figure 15:
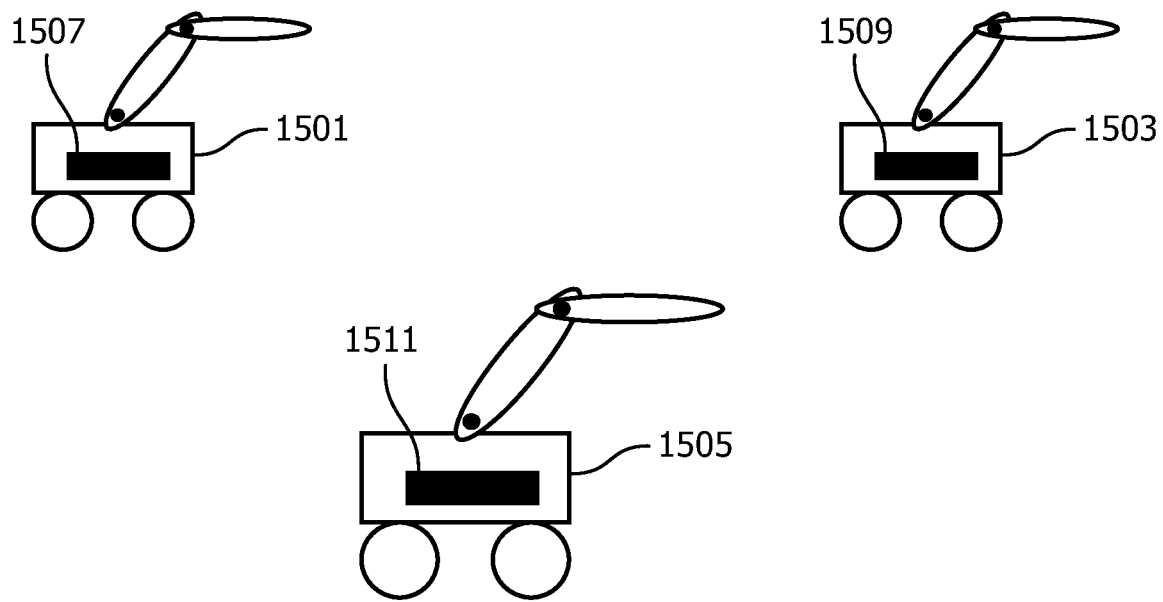
FIG. 15 illustrates an example of an application of the apparatus of FIG. 1.

As a specific example, FIG. 15 illustrates a scenario wherein three industrial robots 1501, 1503, 1505 are positioned within a scene surveyed by an image capture device 101 according to the system of FIG. 1. In the example, each of the three industrial robots 1501, 1503, 1505 are provided with a reflecting element 1507, 1509, 1511 which in the specific example may be retroflective stickers attached to the individual robots. The warehouse may be illuminated by light that will be reflected by the reflecting elements 1507, 1509, 1511 causing these to stand out very clearly in the captured images. As a result, the image objects corresponding to the reflective elements 1507, 1509, 1511 can easily be detected in the captured image and the displacement between corresponding ghost images can be measured resulting in a determination of the distance to the reflective elements 1507, 1509, 1511; and thus to the industrial robots 1501, 1503, 1505.

The retroreflective stickers may thus provide an optical characteristic that makes detection of corresponding image objects much easier and more reliable. The approach may in many ways be similarly to the approach of exploiting the characteristic of bright pupils (i.e. the retroreflective nature of the retina). The approach may further include other measures that can improve operation. For example, the lighting and/or retroreflective stickers may be specifically adapted to provide clearly detectable image objects. For example, the illumination may be selected to have a frequency distribution which matches a frequency response of the retroreflective stickers thereby emphasizing the reflection while attenuating the contribution from other scene objects (or the background). Indeed, in some embodiments, the warehouse may for example be in the dark except for UV light that is reflected by the retroreflective stickers as visible light. In such scenarios, the detector 105 may simply detect bright image areas in the captured image.

In the example of FIG. 15, the scene includes three different industrial robots which are provided with identical retroreflective stickers. In this scenario, the system may continuously track the movement of the robots 1501, 1503, 1505, and may specifically track the movement of the corresponding image objects in the image. The system may accordingly use this information to distinguish between the image objects corresponding to the different robots 1501, 1503, 1505.

In other embodiments, scene objects may be provided with elements having different optical characteristics. Thus, a plurality of scene objects may be detected for distance determination with differentiation being provided by a differentiation of the optical characteristic. For example, the retroreflective stickers may be provided with different patterns that can still be differentiated after the blurring caused by the coded aperture and non-focus plane imaging. As another example the reflective stickers may have different shapes that can be detected in the resulting image objects of the ghost images. Such an approach may allow the system to not only detect a distance to a scene object but to also identify the scene object out of a plurality of scene objects being measured.

In some embodiments, the optical element providing a distinguishable property to the scene object may be an active light source rather than a passive or reflective light source. For example, the industrial robots 1501, 1503, 1505 may be provided with a static or flashing light source, such as a single Light Emitting Diode (LED), or e.g. an array of LEDs. Further, the light sources may specifically be arranged to provide properties that improve or facilitate the detection. For example, infrared or ultraviolet light sources may be provided, or light sources with e.g. a specific color can be used to provide easier detection. For example, each of the industrial robots 1501, 1503, 1505 of FIG. 5 may be provided with a LED array of different colors. E.g. the first robot 1501 may be provided with a red LED array, the second robot 1503 may be provided with a green LED array, and the third robot 1505 may be provided with a yellow LED array. Such an approach may (in particular in an otherwise dark environment) allow for a very simply yet reliable detection of image objects corresponding to the ghost images, and may further allow differentiation between the industrial robots.

It will be appreciated that the different properties described with respect to illumination of a scene to provide easily detectable image objects may equally be used with a reflective or active light source. For example, a polarized light source or polarized reflector may be used with a polarization filter in front of the coded aperture. This may attenuate light from other elements while allowing light from the desired optical elements to pass through substantially un-attenuated. As another example, different colors or patterns may be used to provide detectable and distinguishable properties of the image objects corresponding to the ghost images.

It will be appreciated that a plurality of distance determining devices may be used. For example, devices may be positioned on perpendicular walls of the warehouse thereby allowing distance to be determined along perpendicular axes. This may allow determination of specific positions of the industrial robots in the warehouse.

As yet another example, the detectable optical characteristic may be an attenuation or blocking of light rather than an active or passive light radiation. For example, a conveyer belt may be located in front of a light radiating wall. Thus, the light radiating wall may provide a backlight that can be blocked by items positioned on the conveyer belt. A distance determining device as described may be positioned in front of the conveyor belt and aimed towards the backlight. Items on the conveyor belt will block the backlight resulting in dark image objects corresponding to the ghost images of the dark objects in the captured scene.

As another example, the approach may be used to determine positions of multiple points of an object. For example, when motion capturing an actor for e.g. a game or a virtual movie, an actor may be provided with a number of elements that are tracked in the captured image. For example, a sticker may be provided on relevant positions on the actor's arms, legs, torso etc. A video capture of the actor performing movements then allows a virtual model to be generated that closely matches the actor's movements. Further, by providing these elements as e.g. reflective elements, a distance determining device as described may detect the distance to the reflective elements thereby allowing the video capture to be enhanced by depth information derived from the distance determining device. Thus, improved motion capture can be achieved.

As will be appreciated, the approach may allow for a significantly reduced complexity and may provide a highly advantageous approach for determining distances. Indeed, the approach is particularly suited for many different machine vision systems and applications.

It will be appreciated that the described principles can be used in many different applications and scenarios. For example, the approach may be used to estimate a position of a human where e.g. the position of the image objects in the captured image can be used to determine the position in the plane parallel to the image plane whereas the position in the direction orthogonal thereto is based on the described depth estimation. Such an approach may e.g. be useful for applications such as monitoring systems for elderly or hospital wards, adaptive lighting systems capable of dimming locally to save energy or change beam shapes and spectral signatures to increase comfort. The precise position of human eyes, in particular, can be of interest for display purposes where the view provided is adapted to the detected eye position, for example to provide optimal views to both eyes for 3D imaging or to create a private view in the direction of the nearest pair of eyes while shielding the view in other directions.

Figure 16:
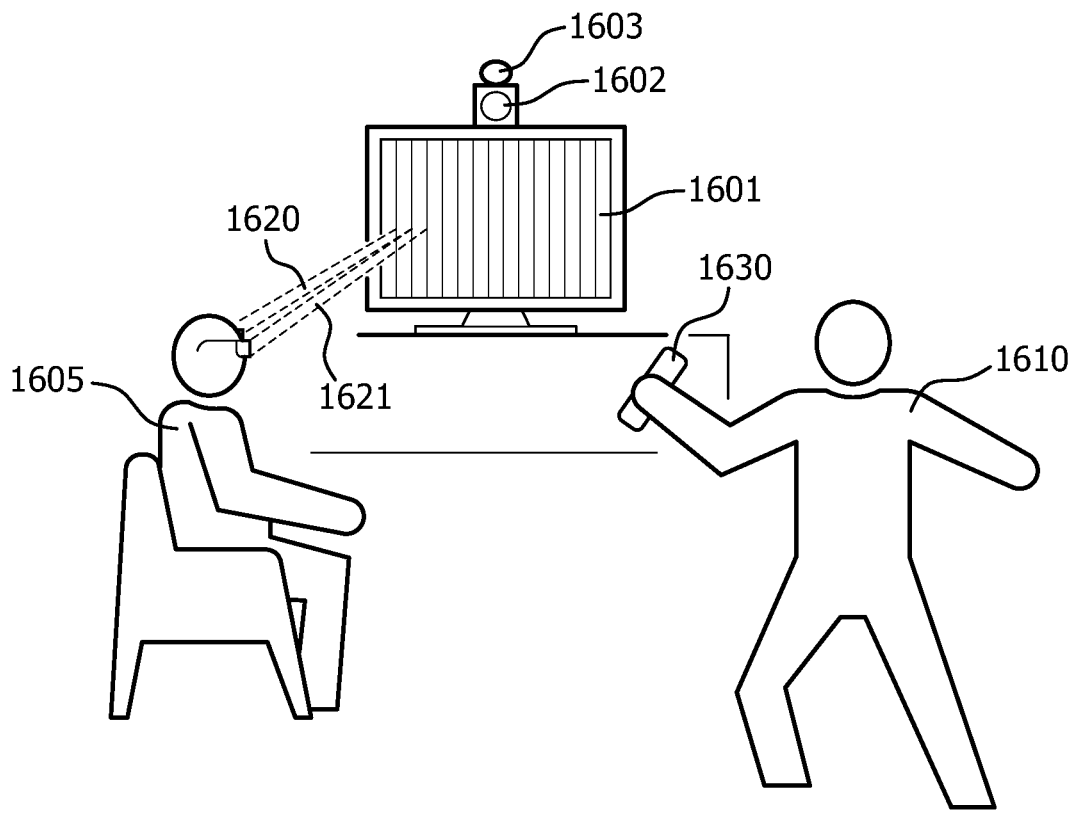
FIG. 16 illustrates an example of using the apparatus in a autostereoscopic display system.

FIG. 16 illustrates an exemplary usage scenario in a 3D rendering system using an autostereoscopic display 1601. For accurate 3D rendering on such a system, it is useful to have information on pose and distance of the viewer's head, not only to potentially create a new 3D rendering, but to create new image view projections 1620, 1621 via a lenticular screen. In particular the head motion should be tracked very quickly, so that the view projections can always be immediately compensated, and the viewer is actually unaware of the system, and sees natural 3D (e.g. not just static viewer 1605, but also walking around viewer 1610, e.g. in a videoconferencing system, or game with motion behavior interaction). Again, one may use a camera 1602 with smartly chosen aperture pattern to easily split the information depending on distance of the viewer's eyes, and the position of the eye patterns can be used to determine e.g. orientation. In particular one can think up aperture patterns or other mappings to functions in the image plane (e.g. via a variable aperture with e.g. an LCD or quickly changing shutter etc) with allow more precise pose determination in addition to geometrical determination relating to distance. Typically connected to the camera there will be an infrared illumination source 1603. It should be understood that the present system can also be used in a user interface system, e.g. portable device 1630 may contain infrared reflection structures such as retroreflecting patterns, and therewith the 3D positioning of that device may be determined, and used in software depending thereon, such as control or gaming software etc. Of course also this portable device may comprise a similar camera system. E.g. typically one or more such camera-based apparatuses embodiments of the present invention may be connected to the display, e.g. in the middle of its upper part, e.g. via an electrical connection to connect a separate apparatus, and a mechanical fixating system.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous.

Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An apparatus, comprising:
an image capture device, wherein the image capture device having a coded aperture and an image sensor,
wherein the image sensor is disposed out of a focal plane for a scene object which is present together with a background in a scene which is imaged by the image capture device,
wherein the coded aperture is formed by two disjoint openings,
wherein each opening has a zone plate pattern,
wherein the two disjoint openings produce two corresponding image objects at the image sensor, and
wherein the two image objects correspond to ghost images of the scene object;
a receiver, wherein the receiver is configured to receive an image of the scene from the image sensor of the image capture device;
a detector, wherein the detector is configured to:
search the image of the scene to identify image areas which have at least one image characteristic corresponding to one or more optical characteristics of the scene object, wherein the one or more optical characteristics include a radiation characteristic of the scene object towards the image capture device, and
detect, in the identified image areas of the image, the two image objects, based on a presence in the identified image areas of the at least one image characteristic corresponding to one or more optical characteristics of the scene object;
a distance estimator, wherein the distance estimator is configured to determine a distance to the scene object in response to a displacement in the image of the two image objects, and
a light source for illuminating the scene, the light source having a characteristic arranged to emphasize the one or more optical characteristics of the scene object such that a difference between the one or more optical characteristics of the scene object and background optical characteristics of the background is increased,
wherein the apparatus is arranged to determine the displacement in the image of the two image objects in response to an interference pattern produced by the zone plate patterns of the two openings.

2. The apparatus of claim 1, wherein the image is a bright pupil image of an eye, and the one or more optical characteristics includes a characteristic of light retroreflected by a retina of the eye towards the image capture device.

3. The apparatus of claim 2, wherein the image is a first image and wherein the receiver is arranged to receive a second image of the scene from the image sensor, the second image being a dark pupil image; and wherein the detector is arranged to compensate the first image for the second image prior to detecting the two image objects.

4. The apparatus of claim 3, wherein the light source is positioned substantially on an optical axis of the image capture device; and the apparatus includes a light source controller arranged to switch on the light source for the first image and to switch off the light source for the second image.

5. The apparatus of claim 2, wherein the two image objects correspond to a first pupil of a person, wherein the detector is arranged to detect an additional two image objects in the image corresponding to ghost images of a second pupil of the person produced by the openings of the coded aperture, and wherein the distance estimator is arranged to determine the distance in response to a displacement in the image of the additional two image objects.

6. The apparatus of claim 2,
wherein the two image objects correspond to a first pupil of a person,
wherein the detector is arranged to detect an additional two image objects in the image corresponding to ghost images of a second pupil of the person produced by the openings of the coded aperture, and
wherein the distance estimator is arranged to determine an orientation of a head of the person in response to a difference between the displacement in the image of the two image objects and a displacement in the image of the additional two image objects.

7. The apparatus of claim 1, wherein the two image objects are disjoint image objects.

8. A system comprising:
an image capture device having a coded aperture and an image sensor, wherein the image sensor is disposed out of a focus plane for a scene object which is present together with a background in a scene which is imaged by the image capture device, wherein the coded aperture is formed by two openings, and
wherein the two openings produce two corresponding image objects at the image sensor, wherein the two image objects correspond to ghost images of the scene object;
a receiver, wherein the receiver is configured to receive an image of a scene from the image sensor;
a detector, wherein the detector is configured to:
identify image areas of the image which have at least one image characteristic corresponding to one or more optical characteristics of the scene object, wherein the one or more optical characteristics include at least one of a color, a brightness, and a pattern of the scene object; and
detect, in the identified image areas of the image, the two image objects based on a presence in the identified image areas of the at least one image characteristic corresponding to the one or more optical characteristics of the scene object;
a distance estimator, wherein the distance estimator is configured to determine a distance to the scene object in response to a displacement in the image of the two image objects; and
a light source, wherein the light source is configured to illuminate the scene, wherein the light source has a characteristic arranged to emphasize the one or more optical characteristics of the scene object.

9. The system of claim 8, further comprising an optical element for attaching to the scene object, the detector being arranged to detect the two image objects in response to an optical property of the optical element.

10. A method comprising:

Illuminating, by a light source, a scene having a scene object together with a background, wherein the light source has a characteristic arranged to emphasize an optical characteristic of the scene object in comparison to a background characteristic of the background;

capturing an image of the scene with an image capture device having a coded aperture and an image sensor,
wherein the image sensor is disposed out of a focal plane for a scene object, wherein the coded aperture is formed by two openings,
wherein the two openings produce in the captured image two corresponding image objects in the captured image, and
wherein the two image objects correspond to ghost images of the scene object;

receiving at a receiver the captured image of the scene from the image sensor of the image capture device;

identifying image areas of the captured image which have an image characteristic corresponding to the optical characteristic of the scene object, wherein the optical characteristic is one of a color, a brightness, and a pattern of the scene object;

detecting by a detector the two image objects in the identified image areas of the captured image based on a presence in the identified image areas of the image characteristic corresponding to the optical characteristic of the scene object; and determining by a distance estimator a distance to the scene object in response to a displacement in the captured image of the two image objects.

11. An autostereoscopic display system, comprising an apparatus of claim 1.

12. A computer-readable storage-medium that is not a transitory propagating signal or wave, the medium containing control information for controlling a method for operating an apparatus to determine a distance to a scene object in at least one image of a scene, the method comprising:

illuminating by a light source, a scene having a scene object together with a background, wherein the light source has a characteristic arranged to emphasize an optical characteristic of the scene object in comparison to a background characteristic of the background;

capturing an image of the scene with an image capture device having a coded aperture and an image sensor,
wherein the image sensor is disposed out of a focal plane for a scene object,
wherein the coded aperture is formed by two openings,
wherein each opening has a zone plate pattern, and
wherein the two openings produce in the captured image two corresponding image objects in the captured image, and
wherein the two image objects correspond to ghost images of the scene object;

receiving at a receiver the captured image of the scene from the image sensor of the image capture device;

identifying image areas of the captured image which have an image characteristic corresponding to the optical characteristic of the scene object;

detecting by a detector the two image objects in the identified image areas of the captured image based on a presence in the identified image areas of the image characteristic corresponding to the optical characteristic of the scene object determining a displacement in the captured image of the two image objects in response to an interference pattern produced by the zone plate patterns of the two openings; and determining a distance to the scene object in response to the displacement in the captured image of the at least two image objects.

13. The apparatus of claim 1, wherein the one or more optical characteristics include at least one of a color, a brightness, and a pattern of the scene object.

14. The system of claim 8, wherein each opening has an interferometric pattern.

15. The system of claim 8, wherein the image is a bright pupil image of an eye, and the one or more optical characteristics includes a characteristic of light retroreflected by a retina of the eye towards the image capture device.

16. The system of claim 15,
wherein the image is a first image, and
wherein the receiver is arranged to receive a second image of the scene from the image sensor,
wherein the second image is a dark pupil image, and
wherein the detector is arranged to compensate the first image for the second image prior to detecting the two image objects.

17. The system of claim 16,
wherein the light source is positioned substantially on an optical axis of the image capture device, and
wherein the apparatus includes a light source controller arranged to switch on the light source for the first image and to switch off the light source for the second image.

18. The system of claim 15,
wherein the two image objects correspond to ghost images of a first pupil of a person,
wherein the detector is further arranged to detect an additional two image objects in the image corresponding to ghost images of a second pupil of the person produced by the openings of the coded aperture, and
wherein the distance estimator is further arranged to determine the distance in response to a displacement in the image of the additional two image objects.

19. The system of claim 15,
wherein the two image objects correspond to ghost images of a first pupil of a person,
wherein the detector is further arranged to detect an additional two image objects in the image corresponding to ghost images of a second pupil of the person produced by the openings of the coded aperture, and
wherein the distance estimator is further arranged to determine an orientation of a head of the person in response to a difference between the displacement in the image of the at least two image objects and a displacement in the image of the additional at least two image objects.

20. The system of claim 8, wherein the two image objects are disjoint image objects.

21. The method of claim 10, wherein each opening has an interferometric pattern.

22. The computer-readable storage-medium of claim 12, wherein the optical characteristic is one of a color, a brightness, and a pattern of the scene object.

* * * * *